United States Patent
Nassar et al.

(10) Patent No.: US 9,672,710 B2
(45) Date of Patent: Jun. 6, 2017

(54) ITEM MOVEMENT TRACKING WITH THREE-DIMENSIONAL (3D) PROXIMITY EXCLUSIONS

(71) Applicant: International Business Machines Corporation, Armonk, NY (US)

(72) Inventors: Nader M. Nassar, Yorktown Heights, NY (US); Annette S. H. Riffe, Chelmsford, MA (US); Robert J. Spremulli, Nashua, NH (US); Bernie K. K. Wong, Lexington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 14/632,776

(22) Filed: Feb. 26, 2015

(65) Prior Publication Data
US 2016/0253885 A1    Sep. 1, 2016

(51) Int. Cl.
*G06K 7/00*    (2006.01)
*G08B 13/24*    (2006.01)
*G06Q 10/08*    (2012.01)

(52) U.S. Cl.
CPC ......... *G08B 13/2462* (2013.01); *G06Q 10/08* (2013.01)

(58) Field of Classification Search
CPC .... G01S 7/003; G01S 7/4004; G01S 13/0209; G01S 13/04; G01S 13/56; G01S 13/878;
(Continued)

(56) References Cited

U.S. PATENT DOCUMENTS 7,394,364 B2    7/2008    Elliott
7,808,388 B2    10/2010    Kangas
(Continued)

FOREIGN PATENT DOCUMENTS

WO    2011143748 A1    11/2011

OTHER PUBLICATIONS

Author Unknown, Store Temporal Security Audit Analysis of Mobile Shopping Behavior, IP Disclosure: IPCOM000211531D, Oct. 10, 2011, pp. 1-3, IP.com, Published online at: http://ip.com/IPCOM/000211531.
(Continued)

*Primary Examiner* — Thien T Mai
(74) *Attorney, Agent, or Firm* — Lee Law, PLLC; Christopher B. Lee (57) ABSTRACT

A proximity exclusion is configured for at least one item in a commercial environment that precludes movement of the at least one item into a defined prohibited region within a structure associated with the commercial environment. Movement of the at least one item is detected within the structure associated with the commercial environment. A determination is made as to whether the movement of the at least one item results in the at least one item being located within the defined prohibited region within the structure associated with the commercial environment. In response to determining that the movement of the at least one item results in the at least one item being located within the defined prohibited region, a proximity exclusion alert is generated indicating that the at least one item is located within the prohibited region.

17 Claims, 4 Drawing Sheets

(58) Field of Classification Search
CPC ........ G01S 13/888; G01S 13/89; G01S 13/87; G08B 13/1636; G08B 13/14; G08B 21/043; G08B 21/0476; G08B 13/196; G08B 13/1427; G08B 21/24; G08B 21/0269; G08B 13/2462; G08B 21/0202; G06F 7/04; H04N 7/18; A61B 5/1128; A61B 5/0013; A61B 5/7282; A61B 5/1176; A61B 5/1116; A61B 5/746; A61B 5/1073; A61B 5/1072; A61B 5/0077; A61B 5/0046; A61B 5/1113; G06K 9/00369; G06Q 50/28; G06Q 20/02; G06Q 20/04; G06Q 20/108; G06Q 20/12; G06Q 20/40; G06Q 20/401; G06Q 30/00; G06Q 30/018; G06Q 30/0261; G06Q 30/0601; G06Q 30/08

See application file for complete search history.

(56) References Cited

U.S. PATENT DOCUMENTS

| | | | |
|---|---|---|---|
| 8,055,277 B2 | 11/2011 | Park et al. | |
| 8,115,623 B1 | 2/2012 | Green | |
| 8,456,297 B2 | 6/2013 | van Os | |
| 2001/0035837 A1* | 11/2001 | Fullerton | G01S 7/003 342/28 |
| 2003/0216969 A1 | 11/2003 | Bauer et al. | |
| 2008/0252459 A1* | 10/2008 | Butler | G06K 7/0008 340/572.1 |
| 2010/0019905 A1 | 1/2010 | Boddie et al. | |
| 2010/0164715 A1 | 7/2010 | Buller et al. | |
| 2010/0176918 A1* | 7/2010 | Turner | G07C 9/00111 340/5.61 |
| 2010/0277322 A1* | 11/2010 | Eckert | G08B 13/2434 340/572.3 |
| 2011/0072132 A1 | 3/2011 | Shafer et al. | |
| 2011/0234397 A1 | 9/2011 | Fetzer et al. | |
| 2012/0293330 A1 | 11/2012 | Grant et al. | |
| 2013/0178233 A1* | 7/2013 | McCoy | H04W 4/021 455/456.3 |
| 2013/0182114 A1* | 7/2013 | Zhang | G06K 9/00369 348/150 |
| 2014/0089243 A1 | 3/2014 | Oppenheimer | |
| 2014/0143061 A1* | 5/2014 | Abhyanker | G06Q 50/01 705/14.58 |

OTHER PUBLICATIONS

Author Unknown, AeroScout Wi-fi RFID Exciters for Enhanced Asset Tracking and Monitoring, Webpage/site, Printed from website on Feb. 23, 2015, p. 1, AeroScout Inc., Published online at: http://www.aeroscout.com/aeroscout-exciters.

* cited by examiner

ITEM MOVEMENT TRACKING WITH THREE-DIMENSIONAL (3D) PROXIMITY EXCLUSIONS

BACKGROUND

The present invention relates to inventory management and theft prevention in retail environments. More particularly, the present invention relates to item movement tracking with three-dimensional (3D) proximity exclusions.

Retail stores sell merchandise to consumers. The merchandise may be manufactured from component products. The component products and the resulting manufactured merchandise may be shipped and stored at a variety of locations until purchased by consumers. Merchandise may include clothing, consumer electronics, tools, chemicals (e.g., fertilizers, insecticides, etc.), and other retail goods.

BRIEF SUMMARY

A method includes configuring, for at least one item in a commercial environment, a proximity exclusion that precludes movement of the at least one item into a defined prohibited region within a structure associated with the commercial environment; detecting movement of the at least one item within the structure associated with the commercial environment; determining whether the movement of the at least one item results in the at least one item being located within the defined prohibited region within the structure associated with the commercial environment; and generating, in response to determining that the movement of the at least one item results in the at least one item being located within the defined prohibited region, a proximity exclusion alert indicating that the at least one item is located within the prohibited region.

A system that performs the method and a computer program product that causes a computer to perform the method are also described.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides item movement tracking with three-dimensional (3D) proximity exclusions. The present technology solves a recognized product and security management problem by providing a new form of computing technology and computational processing that tracks item locations and movement of one or more items into locations/structures within commercial environments that are indicative of risk. By use of the present technology, management and security personnel may more efficiently focus on specific identified risks and risk areas while allowing shoppers and workers to move freely through the commercial environment without intrusive monitoring where a risk has not been actually detected. The risks may include risks of theft, risks of chemical interaction dangers, and other risks associated with placement, manufacture, shipping, storage, and sale of merchandise and components used to manufacture merchandise. Proximity exclusions may be established for items as minimum distance criteria relative either to one or more exclusionary control points (e.g., "keep-out" areas, locations identified as high risk, etc.) or relative to other items (e.g., items identified with interaction dangers). The proximity exclusions may further be established within a three-dimensional (3D) space/grid and may be used to define either or both of vertical and horizontal proximity exclusions into which configured items may not be moved without generating an alert. If an item that is configured with a proximity exclusion is determined to have been moved into a keep-out area, a proximity exclusion alert may be generated to prompt store management and/or security personnel to further review the situation. A camera image captured contemporaneously with the detected movement may be forwarded to security personnel and a particular subject or area may be highlighted for further scrutiny and review.

Exclusionary control points may be configured as keep-out areas of a retail environment (e.g., restrooms, dressing rooms, etc.) within which a consumer may be prohibited from moving a particular item or category of item. Alternatively, items may be configured with proximity exclusions to detect movement of items into proximity with one another (e.g., volatile combinations, such as bleach and ammonia, etc.). As such, the proximity exclusions may operate as mutual exclusions between items and either the control point(s) or between one another. Item tags and proximity exclusion sensors may be utilized to enforce proximity exclusions, and the item tags and proximity exclusion sensors may be implemented using a variety of different technologies, as discussed in more detail below.

For purposes of the present description, a commercial environment may include a retail environment, warehouse, or other environment within which items are to be tracked to enforce proximity exclusions, as appropriate for the given implementation. It is understood that a structure associated with a retail environment may include a structure/building of the commercial environment itself, a partitioned portion of a building (e.g., a dressing room), a cargo truck container bed, a cab of a cargo truck, a fenced warehouse area, or any other structure or container that may be associated with a commercial environment for which proximity exclusions are to be enforced.

Regarding vertical proximity exclusions, the present technology may detect a consumer or store clerk moving an item configured with a vertical proximity exclusion vertically into one or more vertical keep-out regions (e.g., above or below an acceptable height or vertical elevation safety range) while shopping for or stocking items, respectively. The vertical keep-out regions may, for example, prohibit movement of the item vertically above shoulder level or below knee level as the range in-between may be considered typical during a normal shopping experience or during normal shelf stocking in a commercial environment. However, if the item is detected to be moved higher (e.g., above the shopper's shoulders such as being placed under/within a hat or scarf, or above a safe height for retrieval for a fragile or heavy item) or is detected to be moved lower (e.g., below the shopper's knees such as being placed within a shoe/boot or sock, or below a safe height for access by children), a proximity exclusion alert may be generated to prompt store management and/or security personnel to monitor the situation. As such, by detecting movement into a vertical keep-out region within a retail or warehouse environment, the present technology may be utilized to detect and alert workers and security personnel to protect against potential safety risks to workers and consumers and/or to protect against potential theft.

Regarding horizontal proximity exclusions, the present technology may detect a consumer moving an item that is configured with a horizontal proximity exclusion into horizontal keep-out regions, such as a dressing room or rear exit door area, within or near which customers are prohibited from taking merchandise. In such a situation, the dressing room may be configured as an exclusionary control point, and items may be detected as entering proximity of the exclusionary region based upon a distance relative to the exclusionary control point.

Proximity exclusions may be configured with time-based criteria in the form of a time-based proximity threshold that allows temporary deviations for a configured time period beyond which a proximity exclusion alert may be generated. Time deviations may be configured as appropriate for a given implementation, such as between five (5) seconds, ten (10) seconds, or some other threshold of time as appropriate for the given implementation.

As such, if an item with a vertical proximity exclusion is merely dropped during a retail shopping experience or falls off of a shelf during shopping or stocking, but is picked back up by the consumer or a store clerk such that it is back within the acceptable vertical height range within the configured time period, the vertical proximity exclusion alert may not be triggered. Similarly, if a customer walks near an entry door of a dressing room with an item configured with a horizontal proximity exclusion, but continues walking past the area with the item in a reasonable amount of time, the horizontal proximity exclusion alert may not be triggered. Accordingly, the time-based criteria provide a form of time-based proximity hysteresis that may be utilized to avoid unnecessary triggering of proximity exclusion alerts in circumstances that are determined to be corrected in a timely manner. This allows shoppers and workers to move freely through the commercial environment without having to be monitored by security personnel.

The horizontal proximity exclusions may also be configured with a time-based proximity threshold to provide notification hysteresis to detect potential tag tampering and/or removal of tags from items, while avoiding triggering proximity exclusion alerts in circumstances that are corrected in a timely manner. For example, where a store layout has a dressing room configured as an exclusionary control point that is situated at a corner that protrudes into a shopping region, a shopper may be allowed to walk by the corner without triggering a proximity exclusion alert. Alternatively, where shoppers are allowed to take clothing into a dressing room that is configured as an exclusionary control point, clothing items may be configured with time-based criteria to avoid extended times in the dressing room, while other items (e.g., jewelry, electronics, clothing of an opposite gender relative to the shopping area, etc.) may be configured with absolute proximity exclusions to avoid allowing the items to be taken into the respective dressing room.

As such, the present technology provides an efficient flexible item tracking and control system that also incorporates hysteresis to predict when an item is either at risk of being improperly taken into an exclusionary keep-out area, or at risk of exposure to another item or placed in a location that creates a physical risk to persons and property. The proximity exclusions operate to exclude unauthorized transport of items into excluded regions and/or structures where the items are not intended to be moved, or to exclude unauthorized transport of one or more items into proximity of another item. The terms "item," "component," "product," and "merchandise" are used generally interchangeably herein for ease of reference.

Many different types of proximity attributes may be used to track items relative to proximity exclusion keep-out regions, and to detect movement of an item and a resulting location of the item within a prohibited region within a structure associated with the commercial environment. Example proximity attributes include latitude, longitude, speed, acceleration, altitude, and other attributes that may be used to detect actual or pending proximity of a particular tag to one or more keep-out regions.

Technology usable to implement the proximity exclusions include altimeter-based sensor technology, global positioning system (GPS) technology, radio frequency identification (RFID) technology, gyroscope technology, velocity and/or acceleration sensing technologies, and other technologies as appropriate for a given implementation. Further, frequency-based technologies may be used, such as where items are configured to generate a particular frequency, where different frequencies detected by a sensor indicate two items are within a mutually-exclusive prohibited proximity of each other, or where detection of a particular frequency by a sensor in a prohibited region indicates proximity of an item that generates the frequency detected by the sensor is within the prohibited region. As another alternative, signal strength variation technology may be used, where signal transmission strength is tuned to a particular distance, which may be used to detect proximity of items either to each other or to a sensor within a prohibited region.

Additionally, these different types of technologies may be used in combination to implement a particular form of proximity exclusion. For example, two RFID tags may be configured as mutually exclusive RFID tags, where either or both tags may be configured to generate an RFID beacon detectable by the other tag or by an RFID sensor if the two tags are placed into proximity with one another (e.g., either vertically or horizontally). Alternatively, an RFID sensor may be configured within a horizontal or vertical keep-out region, and may detect an RFID tag that is configured to be excluded from the respective keep-out region entering proximity of the RFID sensor.

As another example, where an altimeter-based sensor is utilized to implement a vertical proximity exclusion, RFID technology may be used in combination by placing a stationary RFID sensor at or suspended from a ceiling and/or along a shelf or on a floor of a retail environment. Altimeter sensor readings may be used in combination with detection of an RFID tag on an item coming into proximity with one of the stationary proximity sensors to detect whether the item is entering one of the respective vertical keep-out regions (e.g., leaving an acceptable vertical elevation range for the item).

As another alternative, where GPS technology is used to determine GPS coordinates of an item in a retail environment, RFID technology may again be used in combination by placing a stationary RFID sensor within a horizontal keep-out region of a retail environment (e.g., within a dressing room). GPS readings may be used in combination with detection of an RFID tag on an item coming into proximity with the stationary proximity sensor to detect whether the item is entering the horizontal keep-out region.

Many other possibilities of technology and combinations of technology may be utilized to implement the present technology. It should be understood that any form of underlying technology may be utilized to implement the present subject matter, as appropriate for the given implementation. Additionally, distributed or centralized control may be utilized, as appropriate for a given implementation.

Item tags may also be configured with a category identifier (ID) designating a particular category or type of item. Alternatively, items tags may be configured with a unique item ID to allow tracking of individual items. These category IDs or item IDs may also be used to detect that a particular tag has been moved into an excluded region (again horizontal or vertical) that has been designated as a keep-out area for items of a specific category or for the particular item, respectively. For example, a category tag that has been associated with a high-value item category (e.g., jewelry, video games, etc.) may raise a proximity exclusion alert if it is detected to have been moved into a dressing room.

When a tagged item meets the configured exclusionary criterion, such as having been moved into the specifically designated keep-out area(s), or as having been moved out of its home area for longer than a pre-configured time limit, a proximity exclusion alert may be generated and may appear on the console in a security management office. The most recent security camera image associated with the tag's current 3D grid location in the environment may also be displayed to further assist security personnel with identifying which person is in possession of the item for which the proximity exclusion alert has been generated.

There may also be more than one potential person in a particular image, in which case the security officer may choose to instruct the security camera to continue to follow the tag as it moves through the 3D grid, allowing more precise identification of the person with the item. This may allow security personnel to effectively determine whether to further investigate, or whether the movement of the item is reasonably explained by the circumstances. For example, where a high-value item (e.g., jewelry, a video game, etc.) is carried into the changing room, security personnel may choose to watch for the person leaving the room to ensure the person is still openly carrying the high-value item, or may post someone unobtrusively at the exit of the store in the event the item is no longer openly visible. In the circumstance where the person is openly carrying the item after exiting the changing room, the present technology may be used determine the risk is no longer present. In the circumstance where the high-value item is not being openly carried by the person after the person exits the changing room, the present technology may be used to determine whether the person forgot the high-value item and left it in the dressing room because the tag may be detected to still be located in the dressing room (e.g., the prohibited area). Alternatively, the present technology may detect that the tag is still moving with the person even though not being openly carried by the person. In the latter circumstance, vertical proximity detection may further be used to determine whether the item is at a height proximate to the persons shoes/boots or hat, or in a middle range such as inside a shirt or jacket that is either worn or carried over the person's arm. If the person attempts to exit the retail environment without paying for the item, the present technology provides evidence by which security personnel may not only question the person about the high-value item, but also question the person about the specific location where the item is hidden. In either circumstance, the situation may be reasonably and effectively monitored to avoid any unnecessary disruption of the customer's enjoyment and shopping experience while also mitigating risk.

It should be noted that conception of the present subject matter resulted from recognition of certain limitations associated with item security and safety in retail chains of commerce and within commercial environments. For example, it was observed that prior technologies affix tags to retail items that are deactivated at a point of sale (e.g., a check-out counter), and that if a customer exits through a store exit without the tag deactivated an alert may sound. However, it was determined that these prior technologies do not detect whether an item is currently located within an identified potentially non-secure location within the commercial environment itself, or whether an item/tag has been tampered with within the commercial environment. For example, a shopper with merchandise such as jewelry may enter a location within the structure of a commercial environment, such as a dressing room, or corner that is obscured or hidden from view, where item tracking tags may be physically removed or otherwise compromised. It was further determined that in certain shipping or storage situations, certain types of chemicals must be maintained at particular distances from one another for safety reasons (e.g., volatile combinations, such as bleach and ammonia, etc.), or certain heavy or fragile items must not be stored in high locations due to drop hazards (e.g., pallets of home construction bricks, etc.). It was determined that each of these types of situations relates to a risk that may be defined in terms of "proximity," either of one or more particular items being proximate to a particular location, or of one or more items being proximate to each other, and that as such these types of situations impose "proximity risks" in the form of product loss risks or safety risks, respectively, if not managed. It was further determined that prior technologies are not capable of detecting these types of proximity risks, which often leads to potentially intrusive over-monitoring of shoppers and/or workers, as well as excessive security personnel expenses. It was determined that new smart technology was needed that may programmatically detect potential proximity-based risk situations to generate proximity exclusion alerts so that these types of proximity risks may be mitigated without the need for overt and intrusive monitoring of shoppers and workers. The present subject matter improves item and inventory tracking and helps control costs associated with safety and security in commercial environments by providing for proximity exclusions, as described above and in more detail below. As such, improved risk control related to item movement may be obtained through use of the present technology.

The item movement tracking with three-dimensional (3D) proximity exclusions described herein may be performed in real time to allow prompt detection of items being moved into keep-out regions. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
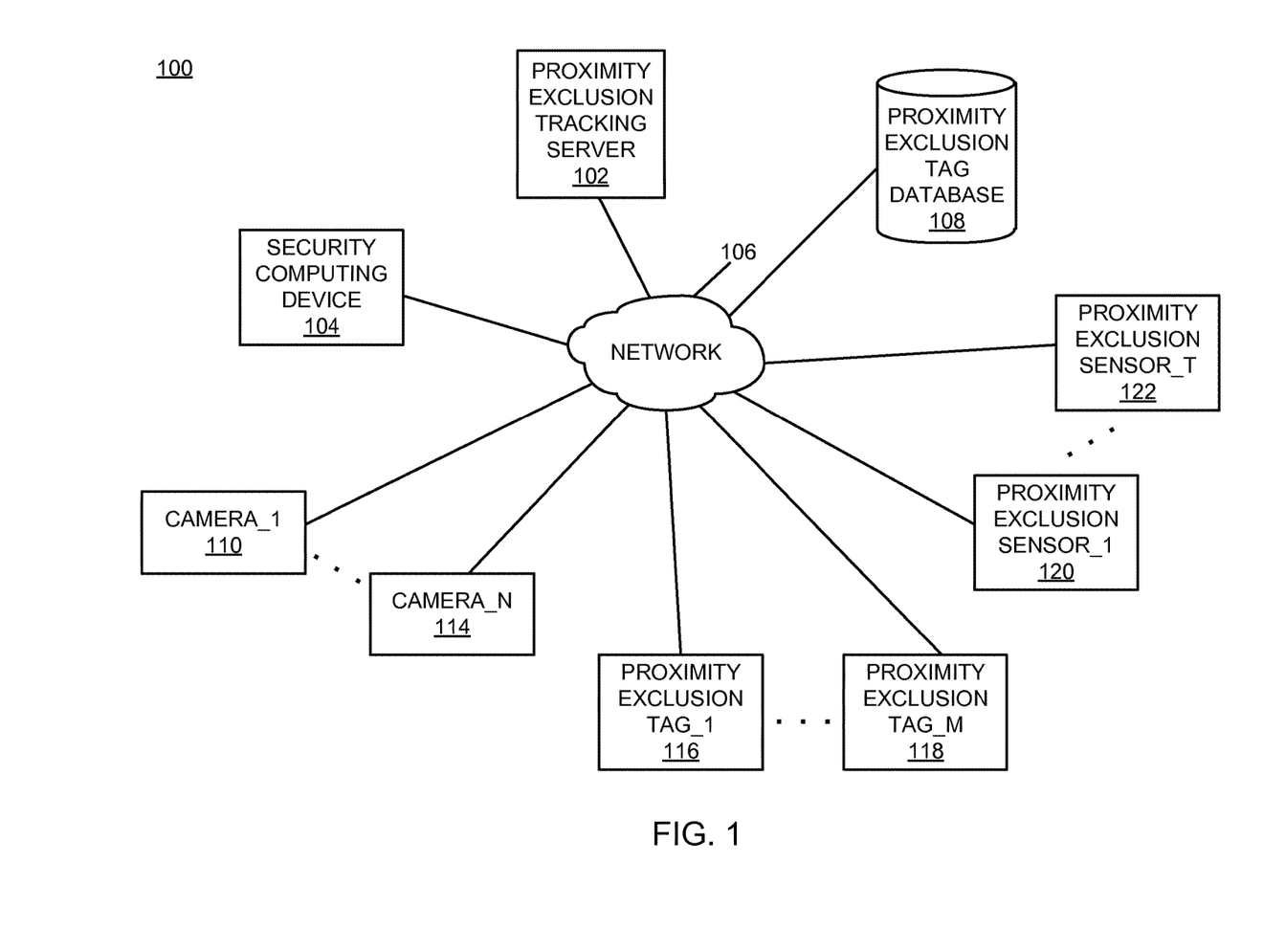
FIG. 1 is a block diagram of an example of an implementation of a system for item movement tracking with three-dimensional (3D) proximity exclusions according to an embodiment of the present subject matter.

FIG. 1 is a block diagram of an example of an implementation of a system 100 for item movement tracking with three-dimensional (3D) proximity exclusions. A proximity exclusion tracking server 102 provides configurable monitoring and control of item movement tracking within a commercial environment (not shown). As described above, the commercial environment may be a retail environment, warehouse, or other environment within which items are to be tracked to enforce proximity exclusions, as appropriate for the given implementation. It is understood that a structure associated with a retail environment may include a structure/building of a commercial environment itself, a partitioned portion of a building, a cargo truck container, a cab of a cargo truck, a fenced warehouse area, a dressing room, or any other structure or container that may be associated with a commercial environment for which proximity exclusions may be established. A security computing device 104 may be used to configure proximity exclusion tracking, and may communicate via a network 106 with the proximity exclusion tracking server 102 and with several other devices. The other devices include a proximity exclusion tag database 108, a camera_1 110 through a camera_N 114, a proximity exclusion tag_1 116 through a proximity exclusion tag_M 118, and a proximity exclusion sensor_1 120 through a proximity exclusion sensor_T 122. Collectively, the system 100 provides management for mutual exclusion of items from locations and/or from other items within a commercial or other environment.

For example, one or more of the camera_1 110 through the camera_N 114 and one or more of the proximity exclusion sensor_1 120 through the proximity exclusion sensor_T 122 may be located within a commercial environment. Further, the proximity exclusion tag_1 116 through the proximity exclusion tag_M 118 may be configured to be read by one or more of the proximity exclusion sensor_1 120 through the proximity exclusion sensor_T 122 using a wireless query mechanism. Alternatively, the proximity exclusion tag_1 116 through the proximity exclusion tag_M 118 may be configured to wirelessly broadcast information detectable by the proximity exclusion sensor_1 120 through the proximity exclusion sensor_T 122, as appropriate for the given implementation.

Further, the respective proximity sensor(s) may be configured as a proximity exclusion control point, and may detect items configured with a proximity exclusion tag entering a location/proximity of the configured proximity exclusion control point. For example, a proximity sensor may be placed in a dressing room, and configured such that the respective location becomes a proximity exclusion control point.

Alternatively, the respective proximity sensor(s) may be configured at a location to detect multiple items with tags configured with mutually proximity exclusions from coming into proximity of each other. For example, one or more proximity sensors may be located within a cargo bay of a truck to detect items with tags configured with mutually proximity exclusions being placed within the cargo bay of the truck, and a proximity exclusion alert may be generated if two such items are detected to be located within proximity of each other as detectable by the proximity sensor(s). Alternatively, one or more proximity sensors may be placed inside a warehouse doorway to detect items with tags configured with mutually proximity exclusions being brought in on the same pallet or placed in proximity to one another within the warehouse, and a proximity exclusion alert may be generated if two such items are detected to be located within proximity of each other as detectable by the proximity sensor(s). Many possibilities for establishment of proximity exclusion control points and for establishment of mutually-exclusive prohibited proximity detection are possible, and all such possibilities are within the scope of the present technology.

As will be described in more detail below in association with FIG. 2 through FIG. 4, the proximity exclusion tracking server 102 and the security computing device 104 may each provide automated item movement tracking with three-dimensional (3D) proximity exclusions. As such, the present technology may be implemented at a user computing device or server device level, or by a combination of such devices as appropriate for a given implementation. The automated item movement tracking with three-dimensional (3D) proximity exclusions is based upon configuration of keep-out regions/zones for items. The keep-out regions may be two-dimensional (2D) or three-dimensional (3D) keep-out zones, as described above and in more detail below. Further, the keep-out regions may be configured for a particular item relative to a particular location or relative to another item. For mutual-item proximity exclusions, one or both items may be configured to generate a proximity exclusion alert if the respective configured proximity exclusion has been breached. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The proximity exclusion tracking server 102 may include any device capable of providing data for consumption by a device, such as the security computing device 104, via a network, such as the network 106. As such, the proximity exclusion tracking server 102 may include a web server, application server, or other data server device.

The proximity exclusion tag database 108 may include a relational database, an object database, or any other storage type of device. As such, the proximity exclusion tag database 108 may be implemented as appropriate for a given implementation.

The camera_1 110 through the camera_N 114 may include any resolution of image capture capability appropriate for the given environment within which the respective cameras are used, and may include night-vision capabilities, along with either black and white imagery or color imagery. The camera_1 110 through the camera_N 114 may incorporate one or more of still image capture and motion image capture. The camera_1 110 through the camera_N 114 may also be implemented as Internet protocol (IP) cameras, wireless cameras, or may utilize another form of communications technology to communicate captured images over the network 106.

The proximity exclusion tag_1 116 through the proximity exclusion tag_M 118 may be associated with a location within the environment and/or with an item itself based upon the particular form of proximity exclusion that is being implemented. The proximity exclusion tag_1 116 through the proximity exclusion tag_M 118 may also incorporate any form of technology or combination of technologies, as described above, to facilitate the sensing of one or more tags in proximity to a horizontal and/or vertical keep-out region. As such, the proximity exclusion tag_1 116 through the proximity exclusion tag_M 118 may be implemented as appropriate for a given environment.

Figure 2:
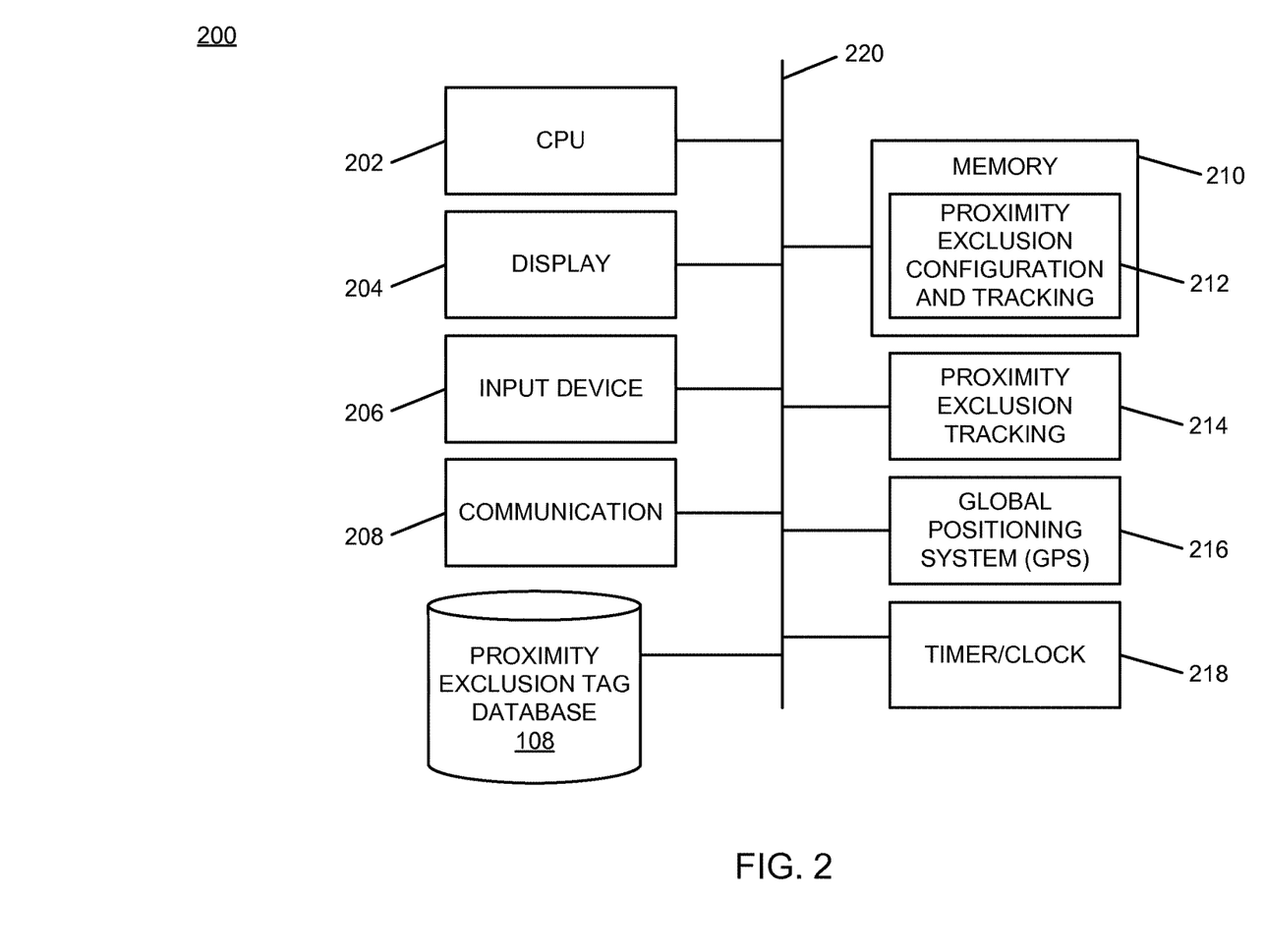
FIG. 2 is a block diagram of an example of an implementation of a core processing module capable of performing item movement tracking with three-dimensional (3D) proximity exclusions according to an embodiment of the present subject matter.

FIG. 2 is a block diagram of an example of an implementation of a core processing module 200 capable of performing item movement tracking with three-dimensional (3D) proximity exclusions. The core processing module 200 may be associated with the proximity exclusion tracking server 102 and/or the security computing device 104, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of tracking of proximity exclusions in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices. For example, the communication module 208 may be used to read item tags or to receive signaling from item tags that is indicative of the tag location vertically, such as where the tag is configured with an altimeter, or other type of technology that may be used to document vertical movement of the item/tag. Alternatively, the communication module 208 may be used to read item tags or to receive signaling from item tags that is indicative of the tag location horizontally, such as where the tag is configured with an accelerometer, gyroscope, or other type of technology that may be used to document horizontal movement of the item/tag.

A memory 210 includes a proximity exclusion configuration and tracking storage area 212 that stores proximity configuration information and proximity exclusions configured for one or more tags, stores environment layout information, and other information usable to implement the item movement tracking with three-dimensional (3D) proximity exclusions described herein. As will be described in more detail below, the information stored within the proximity exclusion configuration and tracking storage area 212 is used to monitor and track item locations and movement within a variety of environments (e.g., manufacturing, shipping, retail, etc.) to identify locations of one or more items that are indicative of risk (e.g., risks of theft, risks of chemical interaction dangers, and other risks associated with placement, manufacture, shipping, storage, and sale of merchandise and components used to manufacture merchandise).

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A proximity exclusion tracking module 214 is also illustrated. The proximity exclusion tracking module 214 provides programmatic configuration of tags with proximity exclusions and provides tracking of proximity exclusion tags for the core processing module 200, as described above and in more detail below. The proximity exclusion tracking module 214 may utilize the communication module 208 to communicate with item tags (e.g., either querying the tags or receiving beacon-type signals, etc.). The proximity exclusion tracking module 214 may utilize other technologies as described above and in more detail below to track item tags. The proximity exclusion tracking module 214 implements the automated item movement tracking with three-dimensional (3D) proximity exclusions of the core processing module 200.

It should also be noted that the proximity exclusion tracking module 214 may form a portion of other circuitry described without departure from the scope of the present subject matter. Further, the proximity exclusion tracking module 214 may alternatively be implemented as an application stored within the memory 210. In such an implementation, the proximity exclusion tracking module 214 may include instructions executed by the CPU 202 for performing the functionality described herein. The CPU 202 may execute these instructions to provide the processing capabilities described above and in more detail below for the core processing module 200. The proximity exclusion tracking module 214 may form a portion of an interrupt service routine (ISR), a portion of an operating system, a portion of a browser application, or a portion of a separate application without departure from the scope of the present subject matter.

A global positioning system (GPS) module 216 provides positioning location coordinates usable for identifying locations and movement of items within an environment. Location identification and movement information generated by the GPS module 216 may be utilized by the proximity exclusion tracking module 214 to detect item proximity exclusion events that are indicative of items being moved into regions of exclusion relative to a particular location or another proximity-exclusion tagged item.

A timer/clock module 218 is illustrated and used to determine timing and date information, such as time-based criteria that allow temporary deviations for a configured time period (e.g., temporal hysteresis), as described above and in more detail below. As such, the proximity exclusion tracking module 214 may utilize information derived from the timer/clock module 218 for time-based information processing activities associated with the item movement tracking with three-dimensional (3D) proximity exclusions described herein.

The proximity exclusion tag database 108 is again shown within FIG. 2 associated with the core processing module 200. As such, the proximity exclusion tag database 108 may be operatively coupled to the core processing module 200 without use of network connectivity, as appropriate for a given implementation.

The CPU 202, the display 204, the input device 206, the communication module 208, the memory 210, the proximity exclusion tracking module 214, the GPS module 216, the timer/clock module 218, and the proximity exclusion tag database 108 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, security management location, or other location, while the CPU 202 and memory 210 may be located at a local or remote server. Many other possible arrangements for components of the core processing module 200 are possible and all are considered within the scope of the present subject matter. It should also be understood that, though the proximity exclusion tag database 108 is illustrated as a separate component for purposes of example, the information stored within the proximity exclusion tag database 108 may also/alternatively be stored within the memory 210 without departure from the scope of the present subject matter. Accordingly, the core processing module 200 may take many forms and may be associated with many platforms.

Figure 3:
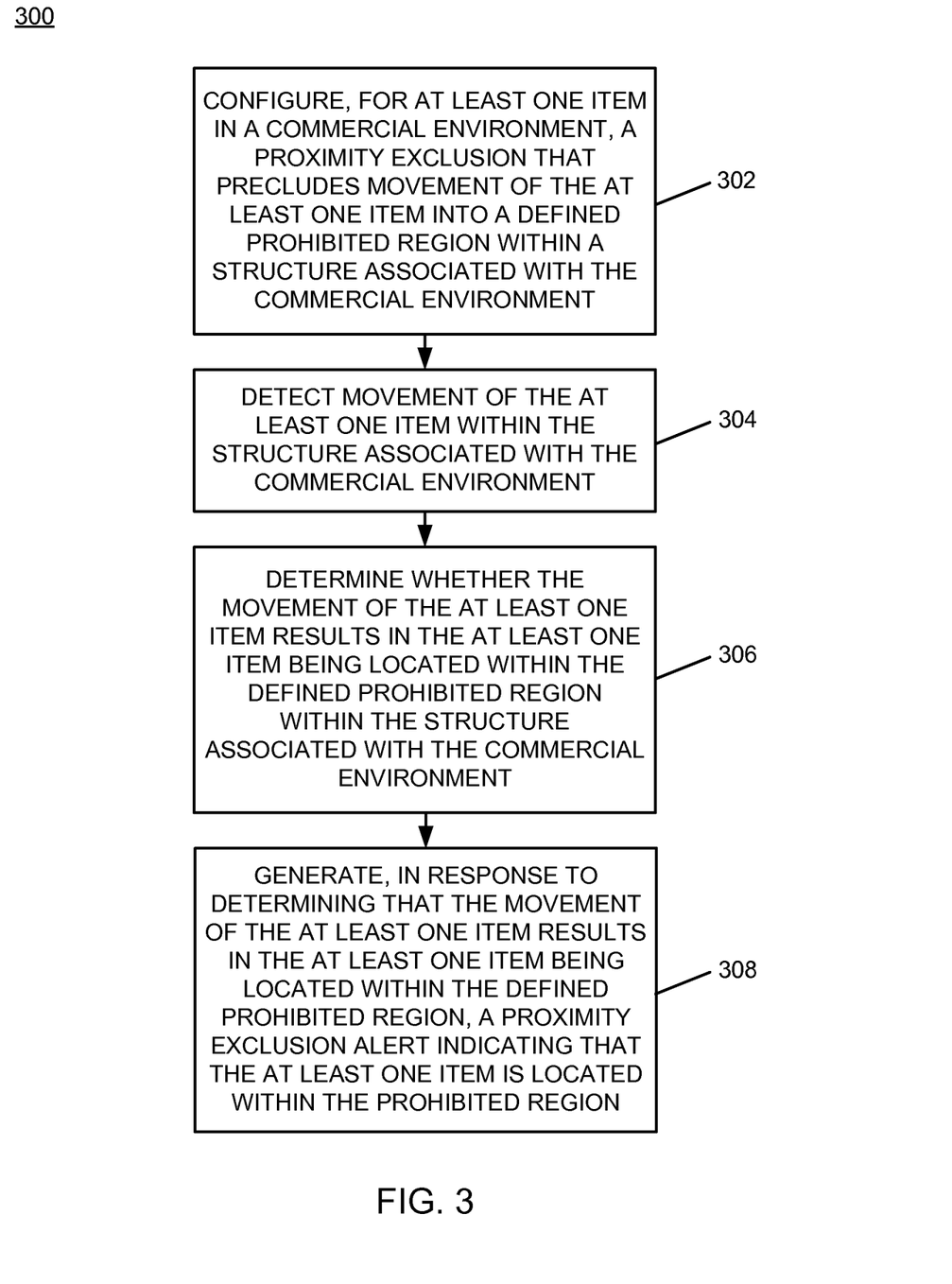
FIG. 3 is a flow chart of an example of an implementation of a process for item movement tracking with three-dimensional (3D) proximity exclusions according to an embodiment of the present subject matter.
Figure 4:
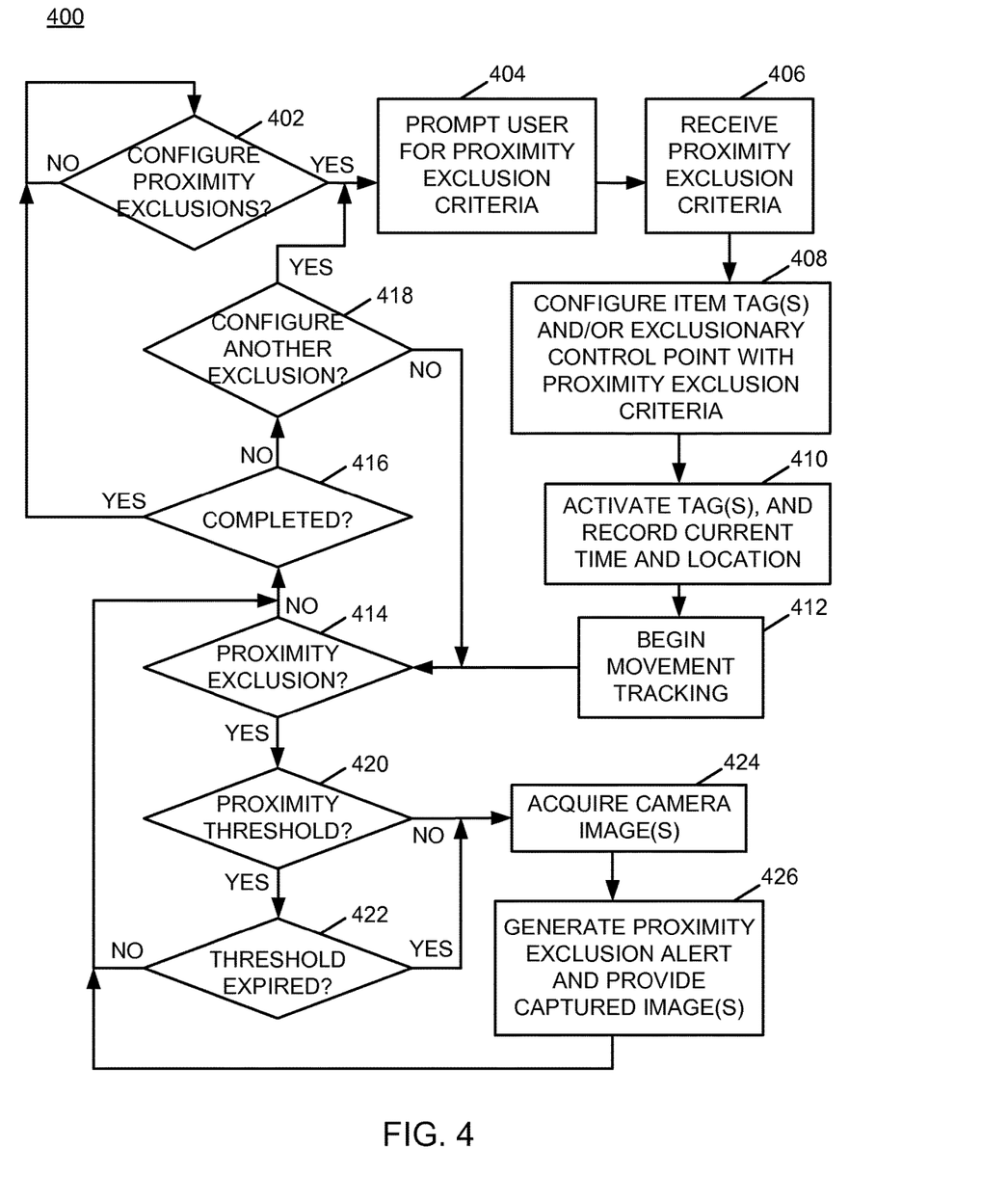
FIG. 4 is a flow chart of an example of an implementation of a process for item movement tracking with three-dimensional (3D) proximity exclusions that includes both configuration and monitoring of proximity exclusions according to an embodiment of the present subject matter.

FIG. 3 through FIG. 4 described below represent example processes that may be executed by devices, such as the core processing module 200, to perform the automated item movement tracking with three-dimensional (3D) proximity exclusions associated with the present subject matter. Many other variations on the example processes are possible and all are considered within the scope of the present subject matter. The example processes may be performed by modules, such as the proximity exclusion tracking module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for item movement tracking with three-dimensional (3D) proximity exclusions. The process 300 represents a computer-implemented method of performing the technical processing described herein. At block 302, the process 300 configures, for at least one item in a commercial environment, a proximity exclusion that precludes movement of the at least one item into a defined prohibited region within a structure associated with the commercial environment. At block 304, the process 300 detects movement of the at least one item within the structure associated with the commercial environment. At block 306, the process 300 determines whether the movement of the at least one item results in the at least one item being located within the defined prohibited region within the structure associated with the commercial environment. At block 308, the process 300 generates, in response to determining that the movement of the at least one item results in the at least one item being located within the defined prohibited region, a proximity exclusion alert indicating that the at least one item is located within the prohibited region.

FIG. 4 is a flow chart of an example of an implementation of a process 400 for item movement tracking with three-dimensional (3D) proximity exclusions that includes both configuration and monitoring of proximity exclusions. The process 400 represents a computer-implemented method of performing the technical processing described herein. It should be noted that the process 400 may be partitioned into two or more processes, such as one process to configure proximity exclusions and another process to monitor/track and detect proximity exclusions. Alternatively, the process 400 may be implemented as a multi-threaded process with separate threads to manage different aspects of the real-time processing, such as one thread to manage configuration of proximity exclusions that may be relatively less time sensitive and another thread to manage critical real-time processing associated with detection and management of proximity exclusions. The respective technical features are described within a single process 400 herein for ease of description.

At decision point 402, the process 400 makes a determination as to whether a request to configure a proximity exclusion has been detected. For example, a user such as a store or warehouse clerk may initiate a request to configure a proximity exclusion where, as described above, a proximity exclusion may be relative to one or more exclusionary control points or relative to other items. In response to determining at decision point 402 that a request to configure a proximity exclusion has been detected, the process 400 prompts the user for proximity exclusion criteria at block 404. The proximity exclusion criteria may include vertical and/or horizontal proximity attributes that designate absolute or referential keep-out regions associated with one or more structures associated with a commercial environment. The proximity exclusion attributes may include keep-out zone(s), altitudes, altitude ranges, distances, velocities, speeds, and other forms of attributes relative to exclusionary control points or other items/tags. The proximity exclusion attributes may also include item and/or category exclusion criteria.

At block 406, the process 400 receives proximity exclusion criteria from the user. At block 408, the process 400 configures one or more item tags and/or an exclusionary control point with the proximity exclusion criteria. The processing at block 408 may include configuring a mutual proximity exclusion between two items that defines a prohibited relative mutually-exclusive region that precludes movement of either one of the two items into proximity of the other one of the two items. As such, where the proximity exclusion is relative to another item (e.g., where a chemical reaction may occur if two chemicals are proximately located), tags associated with each item may be configured with the proximity exclusion criteria. Additionally, the processing at block 408 may include configuring a commercial environment tag sensor situated within the defined prohibited region within a structure associated with the commercial environment to detect proximity of an item tag associated with an item configured with the proximity exclusion. As such, one or more control points may be configured with the proximity exclusion criteria. Alternatively, where the proximity exclusion criteria specify one or more particular exclusionary control points, the respective exclusionary control points may be configured with the proximity exclusion criteria along with the item tag for the item that is excluded from the exclusionary control point. Proximity exclusions may be configured in association with one or more structures associated with a commercial environment, such as a store, a warehouse, a fenced-in material storage yard, a structural container of cargo truck, a cab of a cargo truck, a dressing room, and other forms of structures that may be within or associated with a commercial environment. The processing at block 408 may also include configuring, in association with the proximity exclusion, a time-based proximity threshold that allows the item to be located within the defined prohibited region for a specified period of time.

At block 410, the process 400 activates the tag(s), and records a current time and location of the respective item(s). Recording of time and location of items may be performed, for example, by use of the timer/clock module 218, and the GPS module 216, respectively. At block 412, the process 400 begins movement tracking by monitoring changes in location of the proximity-excluded item(s). The process 400 may detect one or more movements of the item within the 3D structure of the commercial environment. The detected movements of the item may include detecting a vertical movement of the item and/or detecting a horizontal movement of the item.

At decision point 414, the process 400 enters a higher-level iterative loop that iteratively performs processing to determine detection of proximity exclusions at decision point 414, completion of processing at block 416, and receipt of additional requests to configure another tag with a proximity exclusion at decision point 418. In response to a negative determination at any of these decision points 414, 416, and 418, the process 400 iterates through the decision points 414, 416, and 418 respectively until an affirmative determination is made. At decision point 418, in response to determining that a request to configure another tag with a proximity exclusion has been received, the process 400 returns to block 404 and iterates as described above to configure and begin monitoring of the additional proximity exclusions.

Returning to decision point 414, in response to determining that a proximity exclusion has been detected, the process 400 makes a determination at decision point 420 as to whether a time-based proximity threshold (hysteresis) has been configured for the particular item and/or proximity exclusion control point, as appropriate for the particular detected proximity exclusion. The processing at decision point 414 may include determining whether the item has entered a horizontal keep-out region or a vertical keep-out region configured as part of the proximity exclusion for the item. Further, the vertical keep-out region may include one or more of a keep-out region above and a keep-out region below an acceptable vertical elevation range for the item within a structure associated with the commercial environment.

In response to determining at decision point 420 that a time-based proximity threshold has been configured for the item and/or proximity exclusion control point, the process 400 makes a determination at decision point 422 as to whether the configured time-based proximity threshold has expired.

In response to determining at decision point 422 that the configured time-based proximity threshold has not expired, the process 400 reenters the higher-level iteration by returning to decision point 416 and iterates as described above. However, it should be noted that for any detected event, a detected proximity exclusion may remain asserted to ensure timely real-time processing of the detected proximity exclusion. Alternatively, as described above, the process 400 may be multi-threaded to enhance real-time performance and processing associated with detected proximity exclusions. As such, if a request to configure another tag is detected at decision point 418, a new thread may be initiated to perform the proximity exclusion configuration processing to allow prompt return to real-time management of the previously-detected proximity exclusion. As noted above, the process 400 may alternatively be implemented as two processes, as appropriate for the given implementation.

Returning to the description of decision points 420 and 422, in response to determining that a time-based proximity threshold (hysteresis) has not been configured for the particular item and/or proximity exclusion control point at decision point 420, or in response to determining that the configured time-based proximity threshold has expired at decision point 422, the process 400 acquires camera images associated with at or near a location at which the proximity exclusion was detected (e.g., either an exclusionary control point or a location where two mutually-exclusive tags/items have been moved into relative proximity) at block 424. The images may be contemporaneous images captured during the entire movement monitoring of the item that is detected to have violated the proximity exclusion. As such, security personnel may be provided with a time series of images (still or video) that document the item's movement.

At block 426, the process 400 generates a proximity exclusion alert and provides the captured images, as appropriate for the given implementation. As such, in association with generation of the proximity exclusion alert, the process 400 may provide image content of, near the boundary of, or at an entrance of the defined prohibited region (e.g., outside the entrance to a dressing room) contemporaneously captured with detecting the movement of the item within a structure of the commercial environment that is determined to result in the item being located within the defined prohibited region within the structure associated with the commercial environment. The proximity exclusion alert may be caused to be generated either by the item tag itself, or may be caused to be generated to security personnel, as appropriate for the given implementation. Tag generated proximity exclusion alerts may be useful in situations, such as vertical proximity exclusions, where the detected height of a heavy object is causes an immediate alert of danger. Alternatively, generation of proximity exclusion alerts to security personnel may be useful in situations, such as retail environments where a proximity exclusion is detected in association with merchandise. Further, as described above, the proximity exclusion alert may be generated in response to an item being located within the defined prohibited region for longer than the specified period of time within a configured time-based proximity threshold. Upon generating the proximity alert and providing the captured images at block 426, the process 400 returns to decision point 416 and iterates as described above. In response to determining at decision point 416 that processing is completed, the process 400 returns to decision point 402 and iterates as described above.

As such, the process 400 provides technology for configuration of proximity exclusion for items relative to exclusionary control points or relative to other items. The process 400 also provides technology for monitoring configured proximity exclusions, and for generating proximity exclusion alerts in response to detection of a proximity exclusion. The process 400 also implements time-based proximity exclusion thresholds that allow short-term deviations related to configured proximity exclusions.

As described above in association with FIG. 1 through FIG. 4, the example systems and processes provide item movement tracking with three-dimensional (3D) proximity exclusions. Many other variations and additional activities associated with item movement tracking with three-dimensional (3D) proximity exclusions are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:

configuring a merchandise item tag that measures vertical and horizontal coordinates of a merchandise item in a commercial environment with a programmatically-monitorable three-dimensional (3D) merchandise item-specific proximity exclusion that comprises at least one 3D proximity exclusion attribute that precludes movement of the merchandise item into a defined 3D item-configured prohibited region associated with the commercial environment, where configuring the merchandise item tag that measures the vertical and horizontal coordinates of the merchandise item in the commercial environment with the programmatically-monitorable 3D merchandise item-specific proximity exclusion that comprises the at least one 3D proximity exclusion attribute that precludes movement of the merchandise item into the defined 3D item-configured prohibited region associated with the commercial environment comprises:

configuring a programmatically-monitorable 3D mutual merchandise proximity exclusion between two merchandise items that defines a 3D prohibited relative mutually-exclusive region that precludes movement of either one of the two merchandise items into proximity of the other one of the two merchandise items; and the method further comprising:

programmatically monitoring, by iteratively querying the merchandise item tag for its measured vertical and horizontal coordinates, changes of a vertical and horizontal position of the merchandise item within the commercial environment relative to the at least one 3D proximity exclusion attribute; and generating, in response to determining that a detected change of one of the vertical and horizontal position of the merchandise item results in the merchandise item being located within the defined 3D item-configured prohibited region, a merchandise item-specific proximity exclusion alert indicating that the merchandise item is located within the defined 3D item-configured prohibited region.

2. The computer-implemented method of claim 1, further comprising:
configuring a commercial environment tag sensor located within the defined 3D item-configured prohibited region associated with the commercial environment with the at least one 3D proximity exclusion attribute of the merchandise item tag, where the commercial environment tag sensor detects proximity of the merchandise item tag configured with the programmatically-monitorable 3D merchandise item-specific proximity exclusion.

3. The computer-implemented method of claim 1, where the defined 3D item-configured prohibited region comprises a vertical merchandise item-specific keep-out region, and further comprising:
detecting a vertical movement of the merchandise item that results in a vertical change of position of the merchandise item; and
where determining that the detected change of the one of the vertical and horizontal position of the merchandise item results in the merchandise item being located within the defined 3D item-configured prohibited region comprises:
determining that the merchandise item has entered the vertical merchandise item-specific keep-out region.

4. The computer-implemented method of claim 3, where the vertical merchandise item-specific keep-out region comprises at least one of a merchandise item-specific keep-out region above and a merchandise item-specific keep-out region below an acceptable vertical elevation range for the merchandise item in the commercial environment, where the acceptable vertical elevation range defines a 3D region within a single floor elevation of an area of the commercial environment.

5. The computer-implemented method of claim 1, further comprising:
configuring, in association with the programmatically-monitorable 3D merchandise item-specific proximity exclusion, a time-based item-specific merchandise proximity hysteresis threshold that allows the merchandise item to be located temporarily within the defined 3D item-configured prohibited region for a specified period of time without generating the merchandise item-specific proximity exclusion alert; and
where generating, in response to determining that the detected change of the one of the vertical and horizontal position of the merchandise item results in the merchandise item being located within the defined 3D item-configured prohibited region, the merchandise item-specific proximity exclusion alert indicating that the merchandise item is located within the defined 3D item-configured prohibited region comprises:
generating the merchandise item-specific proximity exclusion alert in response to the merchandise item being located within the defined 3D item-configured prohibited region for a longer period of time than the specified period of time of the configured time-based item-specific merchandise proximity hysteresis threshold.

6. The computer-implemented method of claim 1, further comprising:
providing the merchandise item-specific proximity exclusion alert on a console within in a security management office along with a time series of security camera images that document detected changes of vertical and horizontal position of the merchandise item within a 3D grid of the commercial environment prior to the generation of the merchandise item-specific proximity exclusion alert; and
providing image content of at least an entrance to the defined 3D item-configured prohibited region contemporaneously captured with the detected change of the one of the vertical and horizontal position of the merchandise item that resulted in the merchandise item being located within the defined 3D item-configured prohibited region.

7. A system, comprising:
a communication module; and
a processor programmed to:
configure a merchandise item tag that measures vertical and horizontal coordinates of a merchandise item in a commercial environment with a programmatically-monitorable three-dimensional (3D) merchandise item-specific proximity exclusion that comprises at least one 3D proximity exclusion attribute that precludes movement of the merchandise item into a defined 3D item-configured prohibited region associated with the commercial environment, where, in being programmed to configure the merchandise item tag that measures the vertical and horizontal coordinates of the merchandise item in the commercial environment with the programmatically-monitorable 3D merchandise item-specific proximity exclusion that comprises the at least one 3D proximity exclusion attribute that precludes movement of the merchandise item into the defined 3D item-configured prohibited region associated with the commercial environment, the processor is programmed to:
configure a programmatically-monitorable 3D mutual merchandise proximity exclusion between two merchandise items that defines a 3D prohibited relative mutually-exclusive region that precludes movement of either one of the two merchandise items into proximity of the other one of the two merchandise items; and
where the processor is further programmed to:
programmatically monitor, by iteratively querying the merchandise item tag for its measured vertical and horizontal coordinates using the communication module, changes of a vertical and horizontal position of the merchandise item within the commercial environment relative to the at least one 3D proximity exclusion attribute; and
generate, in response to determining that a detected change of one of the vertical and horizontal position of the merchandise item results in the merchandise item being located within the defined 3D item-configured prohibited region, a merchandise item-specific proximity exclusion alert indicating that the merchandise item is located within the defined 3D item-configured prohibited region.

8. The system of claim 7, where the processor is further programmed to:
configure a commercial environment tag sensor located within the defined 3D item-configured prohibited region associated with the commercial environment with the at least one 3D proximity exclusion attribute of the merchandise item tag, where the commercial environment tag sensor detects proximity of the merchandise item tag configured with the programmatically-monitorable 3D merchandise item-specific proximity exclusion.

9. The system of claim 7, where the defined 3D item-configured prohibited region comprises a vertical merchandise item-specific keep-out region, the vertical merchandise item-specific keep-out region comprising at least one of a merchandise item-specific keep-out region above and a merchandise item-specific keep-out region below an acceptable vertical elevation range for the merchandise item in the commercial environment, where the acceptable vertical elevation range defines a 3D region within a single floor elevation of an area of the commercial environment, and where the processor is further programmed to:
  detect a vertical movement of the merchandise item that results in a vertical change of position of the merchandise item; and
  where, in being programmed to determine that the detected change of the one of the vertical and horizontal position of the merchandise item results in the merchandise item being located within the defined 3D item-configured prohibited region, the processor is programmed to:
    determine that the at least one merchandise item has entered the vertical merchandise item-specific keep-out region.

10. The system of claim 7, where the processor is further programmed to:
  configure, in association with the programmatically-monitorable 3D merchandise item-specific proximity exclusion, a time-based item-specific merchandise proximity hysteresis threshold that allows the merchandise item to be located temporarily within the defined 3D item-configured prohibited region for a specified period of time without generating the merchandise item-specific proximity exclusion alert; and
  where, in being programmed to generate, in response to determining that the detected change of the one of the vertical and horizontal position of the merchandise item results in the merchandise item being located within the defined 3D item-configured prohibited region, the merchandise item-specific proximity exclusion alert indicating that the merchandise item is located within the defined 3D item-configured prohibited region, the processor is programmed to:
    generate the merchandise item-specific proximity exclusion alert in response to the merchandise item being located within the defined 3D item-configured prohibited region for a longer period of time than the specified period of time of the configured time-based item-specific merchandise proximity hysteresis threshold.

11. The system of claim 7, where the processor is further programmed to:
  provide the merchandise item-specific proximity exclusion alert on a console within in a security management office along with a time series of security camera images that document detected changes of vertical and horizontal position of the merchandise item within a 3D grid of the commercial environment prior to the generation of the merchandise item-specific proximity exclusion alert; and provide image content of at least an entrance to the defined 3D item-configured prohibited region contemporaneously captured with the detected change of the one of the vertical and horizontal position of the merchandise item that resulted in the merchandise item being located within the defined 3D item-configured prohibited region.

12. A computer program product, comprising:
a computer readable storage medium having computer readable program code embodied therewith, where the computer readable storage medium is not a transitory signal per se and where the computer readable program code when executed on a computer causes the computer to:
  configure a merchandise item tag that measures vertical and horizontal coordinates of a merchandise item in a commercial environment with a programmatically-monitorable three-dimensional (3D) merchandise item-specific proximity exclusion that comprises at least one 3D proximity exclusion attribute that precludes movement of the merchandise item into a defined 3D item-configured prohibited region associated with the commercial environment, where, in causing the computer to configure the merchandise item tag that measures the vertical and horizontal coordinates of the merchandise item in the commercial environment with the programmatically-monitorable 3D merchandise item-specific proximity exclusion that comprises the at least one 3D proximity exclusion attribute that precludes movement of the merchandise item into the defined 3D item-configured prohibited region associated with the commercial environment, the computer readable program code when executed on the computer causes the computer to:
    configure a programmatically-monitorable 3D mutual merchandise proximity exclusion between two merchandise items that defines a 3D prohibited relative mutually-exclusive region that precludes movement of either one of the two merchandise items into proximity of the other one of the two merchandise items; and
  where the computer readable program code when executed on the computer further causes the computer to:
    programmatically monitor, by iteratively querying the merchandise item tag for its measured vertical and horizontal coordinates, changes of a vertical and horizontal position of the merchandise item within the commercial environment relative to the at least one 3D proximity exclusion attribute; and
    generate, in response to determining that a detected change of one of the vertical and horizontal position of the at least one merchandise item results in the merchandise item being located within the defined 3D item-configured prohibited region, a merchandise item-specific proximity exclusion alert indicating that the merchandise item is located within the defined 3D item-configured prohibited region.

13. The computer program product of claim 12, where the computer readable program code when executed on the computer further causes the computer to:
  configure a commercial environment tag sensor located within the defined 3D item-configured prohibited region associated with the commercial environment with the at least one 3D proximity exclusion attribute of the merchandise item tag, where the commercial environment tag sensor detects proximity of the merchandise item tag configured with the programmatically-monitorable 3D merchandise item-specific proximity exclusion.

14. The computer program product of claim 12, where the defined 3D item-configured prohibited region comprises a vertical merchandise item-specific keep-out region, and where the computer readable program code when executed on the computer further causes the computer to:
  detect a vertical movement of the merchandise item that results in a vertical change of position of the merchandise item; and
  where, in causing the computer to determine that the detected change of the one of the vertical and horizontal position of the merchandise item results in the merchandise item being located within the defined 3D item-configured prohibited region, the computer readable program code when executed on the computer causes the computer to:
    determine that the merchandise item has entered the vertical merchandise item-specific keep-out region.

15. The computer program product of claim 14, where the vertical merchandise item-specific keep-out region comprises at least one of a merchandise item-specific keep-out region above and a merchandise item-specific keep-out region below an acceptable vertical elevation range for the merchandise item in the commercial environment, where the acceptable vertical elevation range defines a 3D region within a single floor elevation of an area of the commercial environment.

16. The computer program product of claim 12, where the computer readable program code when executed on the computer further causes the computer to:
  configure, in association with the programmatically-monitorable 3D merchandise item-specific proximity exclusion, a time-based item-specific merchandise proximity hysteresis threshold that allows the merchandise item to be located temporarily within the defined 3D item-configured prohibited region for a specified period of time without generating the merchandise item-specific proximity exclusion alert; and
  where, in causing the computer to generate, in response to determining that the detected change of the one of the vertical and horizontal position of the merchandise item results in the merchandise item being located within the defined 3D item-configured prohibited region, the merchandise item-specific proximity exclusion alert indicating that the merchandise item is located within the defined 3D item-configured prohibited region, the computer readable program code when executed on the computer causes the computer to:
    generate the merchandise item-specific proximity exclusion alert in response to the merchandise item being located within the defined 3D item-configured prohibited region for a longer period of time than the specified period of time of the configured time-based item-specific merchandise proximity hysteresis threshold.

17. The computer program product of claim 12, where the computer readable program code when executed on the computer further causes the computer to:
  provide the merchandise item-specific proximity exclusion alert on a console within in a security management office along with a time series of security camera images that document detected changes of vertical and horizontal position of the merchandise item within a 3D grid of the commercial environment prior to the generation of the merchandise item-specific proximity exclusion alert; and
  provide image content of at least an entrance to the defined 3D item-configured prohibited region contemporaneously captured with the detected change of the one of the vertical and horizontal position of the merchandise item that resulted in the merchandise item being located within the defined 3D item-configured prohibited region.

* * * * *